Feb. 17, 1942.    D. A. STROMSOE    2,273,154
PIPE JOINT
Filed April 5, 1940    2 Sheets-Sheet 1
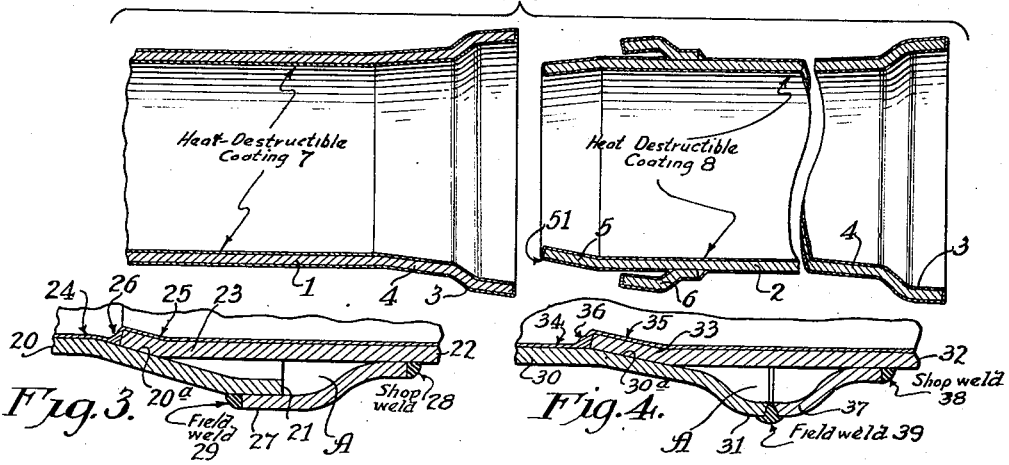
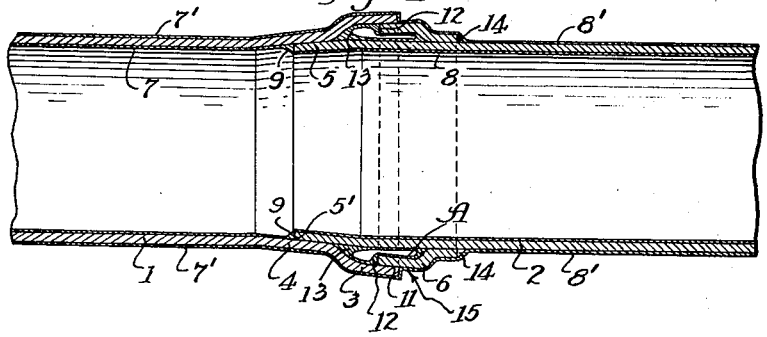
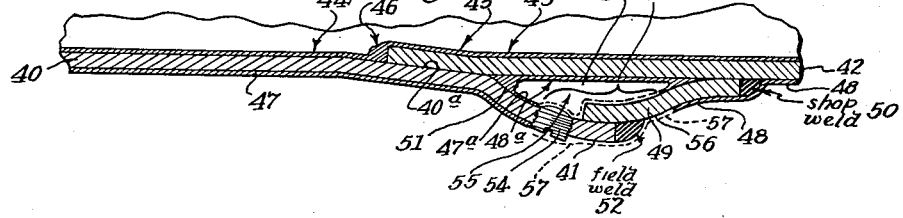
Douglas A. Stromsoe
INVENTOR.
BY
ATTORNEY.

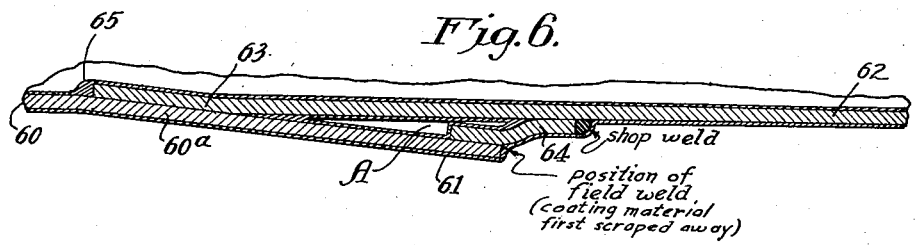
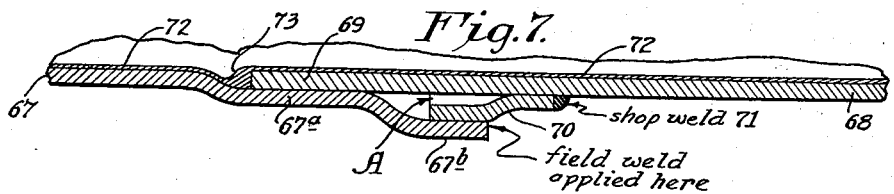
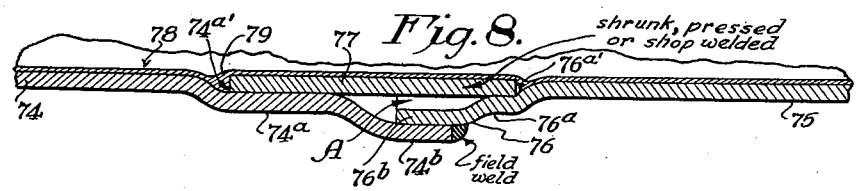
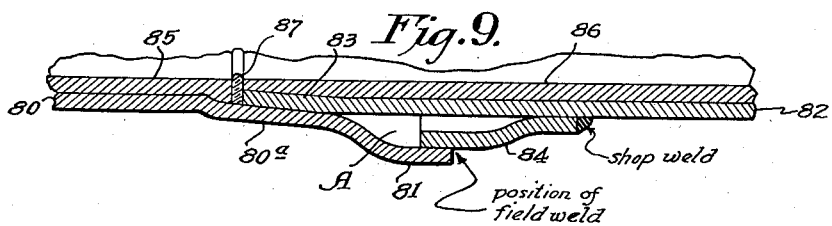
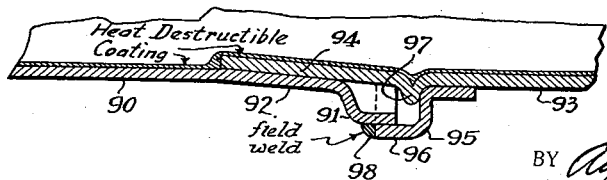

Patented Feb. 17, 1942

2,273,154

UNITED STATES PATENT OFFICE 2,273,154

PIPE JOINT

Douglas A. Stromsoe, San Gabriel, Calif.

Application April 5, 1940, Serial No. 328,047

3 Claims. (Cl. 285—115)

This invention relates to joint structures for fluid conduits having an internal heat-destructible lining providing a protective coating adapted for corrosion resistance or the like, in which two adjacent metallic conduit sections are intersecured through the agency of heat fusion without detrimental effect upon such lining.

The invention is particularly concerned with the formation of joints using "dipped" pipe in which sections are intersecured by a welding seam without resultant destruction of the dipped coating in the interior of the conduit.

The invention is also applicable to conduits provided with heat-destructible internal linings other than of the "dipped" type, such as preformed cementitious coatings, as will be apparent.

One of the particular objects of the invention is to provide a welded, brazed or soldered metallic conduit construction having a joint structure characterized by the provision of male and female overlapping portions each carrying an internal heat-destructible protective lining which is caused to be in an interconnected relation at the juncture of the two sections of conduit, in which the two sections of conduit are intersecured through the agency of peripherally extending flange or skirt members secured together in radially spaced relation to the main conduit by a heat-fusion operation, whereby conduction of heat to the heat-destructible lining is minimized to a point such that the lining remains substantially intact.

In its broad aspects, the joint construction of the present invention comprises one pipe section which is provided with a bell end and adapted to receive a second pipe section in contiguous joined relation, said second pipe section having a spigot end portion extending within the bell end of the first pipe section, in which each of the pipe sections is provided with a layer of heat-destructible material disposed in contact with the inner peripheral surface, the respective layers of heat-destructible material being caused to be in interconnected state at the juncture of the two pipe sections so as to provide a substantially continuous internal protective coating, together with a peripherally extending flange or skirt member secured to or forming a part of the spigot-carrying section and secured as by welding to the bell end of the first-mentioned pipe section, such flange member being extended outwardly from the pipe section to which it is secured, in radially spaced relation thereto, whereby the weld or other heat-fusion procedure which is applied to join the two pipe sections is caused to be in a radially spaced relation to the spigot end portion of the second-mentioned pipe section, and the layer of protective material carried thereby is removed from the zone of heat influence established by the welding or other heat-fusion operation.

Other objects of the invention will be brought out in the ensuing description of certain preferred embodiments thereof, or will be apparent from such description. The accompanying drawings illustrate several embodiments of the invention, and referring thereto:

Fig. 1 is a longitudinal section of the bell and spigot ends of two pipe sections which are to be joined to form a joint structure according to this invention;

Fig. 2 is a corresponding view of the two pipe sections brought into position ready to be intersecured by a field welding operation;

Fig. 3 is a fragmentary detail of a joint, corresponding to the lower portion of Fig. 2, on somewhat larger scale, and illustrating a minor modification of the construction;

Fig. 4 is a view corresponding to Fig. 3, showing a further modification of the construction;

Fig. 5 is a view corresponding to Figs. 3 and 4, showing the joint in welded conidtion in a modification providing for placement of a body of protective material internally of the position of the weld;

Figs. 6 through 10 illustrate further modifications of the construction, showing various embodiments of the invention.

Referring particularly to Figs. 1 and 2 of the drawings, two pipe sections are shown at 1 and 2 which are adapted to be placed together in contiguous relation to form a joint. The pipe section 1 may comprise a female end having an outwardly extending bell portion 3 including a tapered neck portion 4. The pipe section 2 is provided with a spigot end portion 5 which is preferably tapered at an angle corresponding to the taper of the neck portion 4, and a peripherally extending flange member 6 adapted, in this embodiment, to extend concentrically inward of the bell portion 3. Each of the pipe sections 1 and 2 is provided with an internal coating or lining, as shown at 7 and 8, of a heat destructible material, such as asphalt, tar, or other plastic material, which may be applied by dipping, spraying, spinning, molding, or in any other suitable tmanner. The spigot portion 5 is adapted to mate with the neck portion 4 to provide a compression joint between the two sections which is closed by longitudinal relative movement of the bell and spigot ends as the joint is made, and it will be seen that the leading or entering edge 5' of the spigot portion 5 will slide along the inner periphery of the neck 4 during this longitudinal relative movement and this will serve to displace the surplus coating material 7 from adjacent the aforesaid neck portion, which displaced material will accumulate forwardly of the edge 5' after the manner indicated at 9 in Fig. 2. In a similar manner, if the pipe sections are provided with external protective coatings as at 7' and 8', the flange and bell portions 6 and 3, respectively, of the two pipe sections will slide past one another as at 11 in moving to overlapping position and displace the surplus coating material which may accumulate as at 12, and some material may also be displaced from the exterior of the spigot portion 5 and accumulate as at the position 13.

The flange member 6 may be secured to the pipe section 2 in any suitable manner, preferably by welding, as indicated at 14, and inasmuch as this weld is preferably made in the shop, and the coating material applied to the pipe section after the welding operation, no loss of coating material at this position is experienced. The welding operation which joins the pipe sections 1 and 2 in the field is conducted at the position of overlap of the bell section 3 with the flange member 6, as indicated at 15, providing an annularly extending welded ring which may be made fluid-tight. The application of this weld, and the effect thereof upon the coating material providing the protective lining for the conduit will more readily be appreciated from a consideration of Figs. 3, 4, and 5, hereinbelow described, the larger scale on which the modifications of the construction are illustrated being more conducive to an understanding of the conditions obtaining during the formation of the welded joints. For this reason, reference is had to the above-mentioned Figs. 3–5 for a description of this welding operation, with the understanding that the same conditions obtain in connection with the form shown in Fig. 2 during the field operation of completing the joint.

Referring particularly to Fig. 3, a pipe section is shown at 20 provided with a bell portion 21 having a tapered neck portion 20a, and a second pipe section 22 provided with a spigot end portion 23 forced longitudinally into engagement with the neck portion 20a of the pipe section 20. The longitudinal movement of the two pipe sections in the joining operation causes the two protective linings 24 and 25 of the respective pipe sections to build up or accumulate as at 26 adjacent the projecting end of the spigot portion 23 of the pipe section 22, as above described. In this form of the invention, the pipe section 22 is provided with an outwardly spaced flange or skirt member 27 adapted to fit exteriorly of the bell portion 21, and is shop welded to the pipe section 22 as at 28. When the two pipe sections are brought into the desired compressive engagement by relative longitudinal movement of the two sections, a field weld is applied between the bell portion 21 and the flange 27, as at 29. This form of the invention differs from the form shown in Figs. 1 and 2 primarily in that the flange or skirt member 27 attached to the spigot end pipe section extends exteriorly of the bell portion of the bell end pipe section.

The form of joint construction shown in Fig. 4 may comprise a pipe section 30 provided with a bell end 31 having an intermediate tapering neck portion 30a, together with a spigot end pipe section 32 provided with a spigot end 33 fitting within the neck portion 30a of the pipe section 30. The respective pipe sections are provided with internal protective coatings as at 34 and 35, which coatings will accumulate as at 36 upon relative longitudinal movement of the two pipe sections into the desired compressional engagement. In this form of the invention the flange member 37 which is welded or otherwise secured to the pipe section 32 as at 38 is caused to be substantially of the same outward projection from the main wall of the conduit as is the bell portion 31 of the conduit 30, and the flange portion 37 is welded to the bell portion 31 of the section 30 in abutting relation as at 39 by a field weld after the desired compressive engagement of the bell and spigot ends of the two pipe sections is secured.

The form of pipe joint illustrated in Fig. 5 is substantially comparable to that illustrated in Figs. 1 and 2, with one minor alteration, as hereinafter brought out, and may comprise a pipe section 40 provided with a bell portion 41 joined to the pipe section 40 through a tapering neck portion 40a. The pipe section 40 is compressively engaged with a pipe section 42 provided with a spigot end portion 43 mating with the tapering neck portion 40a of said section 40. The respective pipe sections are provided with a plastic heat-destructible internal layer or coating, as at 44 and 45, which accumulates at the forward end of the spigot portion 43 in some such manner as shown at 46 when the necessary relative longitudinal movement of the two pipe sections is produced to obtain the desired inner engagement of the two pipe sections. In this figure the pipe sections are shown also as provided with exterior coatings of a heat-destructible protective nature, as at 47 and 48 respectively, the internal and external coatings being conveniently formed by a dipping procedure which uniformly coats all portions of the pipe. For this reason the portions of the pipe interiorly of the position of the bell portion 41 of the pipe section 40 will also be provided with a coating layer, as indicated at 47a and 48a respectively. The spigot end portion of the pipe section 42 is provided with a flange member 49 corresponding in function to the flange member 6 described above in connection with Figs. 1 and 2, said flange member 49 being joined to the pipe section 42 by a shop weld 50. When the two pipe sections are brought into engagement, in the formation of the accumulation of the internal coating as at 46, a comparable accumulation of the external coatings 47a and 48a will be formed, as indicated at 51. When it is desired to intersecure the pipe sections 40 and 42 by welding, the coating composition may be scraped away from the bell portion 41 and the flange member 49 at their overlapping positions, and a field weld applied. Such a field weld is shown at 52, and the heat produced by the welding operation will melt away or destroy the coating composition located interiorly of the flange 49, as through a space such as at the dotted space which is bracketed at 53.

If it is desired to thoroughly protect the space between the spigot end portion of the section 42 and the position of the bell portion 41 and flange 49, I may provide a tapped plug 54 in the bell portion 41, which may be removed after the field weld 52 is applied, and the space 55 then filled with a suitable corrosion-resistant composition, as through the agency of a pressure gun, and the plug then replaced. A brush coat of protective material may then be applied peripherally about the joint, as at the dotted zone indicated at 57, to complete the external corrosion protection for the joint construction.

The fluid tight joint provided by the construction shown in Figs. 1 through 5 will be seen to provide a uniform and continuous internal coating layer of protective material, which, if it is of a plastic nature, will build up to some extent at the internal position of overlap of the two pipe sections.

The compression joints provided between the tapering neck portion of the bell portion of the one pipe section and the tapering spigot end of the other pipe section may be so formed as to be effective to withstand the fluid pressure which may be established within the conduit, and the external field weld which is applied at 15, 29, 39, or 52, may be relied upon to maintain the desired relation of the pipe sections. Where such compression joints are found inadequate, the external field-welded connection of the bell portion of one section to the flange or skirt of the other section may be made fluid-tight. In this connection, should a small amount of liquid be forced from the conduit into the space surrounding the spigot end of the construction and within the welded flanges, herein generally designated as space A, it will be appreciated that this fluid will not be in free circulation with the interior of the conduit, hence any minor corrosion which might be produced by the entrance of fluid into such space will be of such nominal deteriment as to be disregarded. Furthermore, where a plastic internal coating is employed, the accumulation of the plastic coat at positions such as shown at 9, 26, 36 and 46, will for the most part prevent ingress of fluid to the space A, inasmuch as the accumulation of coating material at these positions will present an adequate supply of coating material which could be forced into any irregularities between the bell and spigot end portions of the respective pipe sections under the fluid pressure within the conduit, sealing such irregularities for all practical purposes. For this reason, I do not consider it necessary to resort to the expedient shown in Fig. 5 of filling the space A with a further quantity of protective material, unless the service to which the conduit is to be placed is very extreme from the corrosion standpoint.

It will be appreciated that many modifications in the shape of the bell and spigot portions of the construction may be resorted to, within the broad spirit and scope of contemplation of this invention, as may be dictated by the requirements of a particular installation or the choice of the user. Certain modifications thereof are illustrated in Figures 6 through 9, and referring thereto, the form shown in Fig. 6 is essentially comparable to that shown in Figs. 1 and 2, wherein a pipe section 60 provided with a bell portion 61 is joined to a pipe section 62 having a spigot end 63 by welding between the bell portions 61 and a peripherally extending flange 64 secured to the section 62. In this form of the invention, the neck portion 60a of the bell end section 60 is made relatively long and tapering, so that the internal position of overlap of the two pipe sections indicated at 65 is longitudinally removed from the position of the field weld for a greater distance than that obtaining in the form shown in Figs. 1 and 2.

In Fig. 7 I have shown a form of construction in which the overlapping spigot and bell portions of two pipe sections 67 and 68 are cylindrical in form, the spigot end 69 of the pipe section 68 being extended as a cylindrical member, and the bell portion of the pipe section 67 being formed in two steps of increased diameter, as at 67a and 67b. The portion 67a constitutes the neck portion of the bell end of the pipe section 67 and is adapted to fit closely about the projecting or outer end of the spigot portion 69 of the pipe section 68, and the bell portion 67b, being of greater diameter, is disposed outwardly of the position of the spigot portion 69 of the pipe section 68 to provide a space A therebetween, and the two pipe sections may be inter-secured as by a field weld between the edge of the portion 67b and a flange 70 which may be secured to the pipe section 68 by a shop weld as at 71. The internal coating for the two pipe sections as indicated generally at 72, and the accumulation of the internal coating material occasioned by the longitudinal relative movement of the two pipe sections in assembly is indicated at 73.

In Figs. 7, 8 and 10 no external protective coating is illustrated, but it will be appreciated that an external coating will be provided, if necessary, as shown particularly in Fig. 5.

In the form shown in Fig. 8, two pipe sections 74 and 75 are interjoined through the agency of two sets of outwardly extending flange members, the flange member for the section 74 being shown at 74a and 74b in a double step type of outward projection such as shown at 67a and 67b in Fig. 7, and the flange portion 76 provided for the pipe section 75 is comparably stepped outwardly as at 76a and 76b. The spigot end for the pipe section 75 is in this instance shown as a separate cylindrical member 77 which may be shrunk, pressed, welded or otherwise secured to either of the pipe sections 74 or 75 (pipe section 75 in this instance) prior to the application of the internal coating layer 78, and the flange portions 74b and 76b are spaced outwardly a sufficient distance to establish the desired space A therebetween. Upon relative longitudinal movement of the pipe sections 74 and 75 to secure the desired positioning of the several parts, the accumulation of internal coating material shown at 79 will result as is described in connection with the above forms of the invention, and upon application of the field weld in the manner above described, the joint is ready for use.

The construction shown in Fig. 8 is also subject to the employment of the portion 77 as an independent element, precoated, and inserted into one or the other of the pipe sections 74 or 75 in the field at the time the joint is completed. In such use, either of the sections 74 or 75 could be considered the "bell" section, with the "spigot" actually provided by the separate piece 77. The spaced shoulders 74a' and 76a' formed by the stepped portions 74a and 76a of the respective flanged portions of the pipe sections will securely position the portion 77 against longitudinal dislocation in assembly and use. The portion 77 may be considered as being disposed in fluid-conducting connection with both pipe sections 74 and 75 although not actually connected thereto except against longitudinal displacement as above described.

In Fig. 9 I have illustrated the application of my invention to a joint construction for pipe sections provided with a cast internal lining of a rigid composition, such as of a hydraulic cement or material of comparable character. In this form of the invention, the pipe section 80 is provided with a bell portion 81 having a tapered neck portion 80a, and the joining pipe section 82 is provided with a spigot portion 83 extending within and mating with the neck portion 80a of the pipe section 80, and the two pipe sections are intersecured through a flange member 84 which is secured to the pipe section 82 in the shop, as above described, and secured to the bell portion 81 of the pipe section 80 through the agency of the field weld. The internal coatings of protective material are formed within the two pipe sections by a casting operation prior to the field assembly, and are indicated at 85 and 86 respectively. These coatings are illustrated as being of somewhat greater thickness in proportion to the thickness of the pipe wall than was shown in connection with Figs. 1 through 8, inasmuch as the cast type of coatings may be of comparatively greater thickness. In order to provide the desired intersealing at the abutment of the two coatings 85 and 86 corresponding to the position of the accumulated plastic coating indicated above at 9, 26, 36, 46, 65, 73 and 79, I may provide a compressible gasket or sealing member 87 of rubber, plastic composition, or other suitable material positioned in abutting relation to coating portions 85 and 86, which will be brought into a joint-sealing condition upon the longitudinal relative movement of the pipes in the formation of the joints, and held in that position by the field weld which is subsequently applied.

The joint structures of this invention are readily fabricated from any suitable metallic conduit, such as light or heavy steel, brass, copper, cast iron, or the like. The permanent attachment of adjoining pipe sections will obviously be selected with due regard to the nature of the material forming the pipe sections, welding (spot, gas, arc or resistance welding, for example), brazing, or soldering being the conventional procedures, and each requiring that the temperature of the pipe sections at the position of the attachment be raised to a value considerably above the normal temperature of the conduit. In the present description, the attachment is generally referred to as a "weld," as typifying such a heat-generated attachment, and wherever such reference is made it will be understood that it is illustrative only, and not limitative.

The heat-destructible protective coating may be formed of any material which will completely coat the inner surface of the conduit and protect the same against corrosion or other deleterious action, and the term "heat-destructible" is to be understood to cover any such protective coating which, if unduly treated, is liable to be destroyed or otherwise impaired in such manner that it will not effectively protect the surface of the conduit. For example, the protective lining or coating for the interior of the conduit may be formed of a heat-fluent material, such as asphaltum or tar, which would soften and flow if the wall portion of the conduit was heated to the melting or softening point of such material, or it may be formed of cement or other rigid material which is subject to cracking or disintegration if heated above a certain temperature.

According to the constructions described herein, an extended path of heat flow from the position of the weld or other heat-generated attachment to the side wall of the conduit which supports the protective coating is established, whereby the temperature of such side wall is not caused to reach a value such as to result in the destruction or impairment of the protective coating (it being understood that "destruction" of the protective coating does not necessarily require destruction of the coating material per se).

This extended path of heat flow is caused to be materially greater than the thickness of the conduit wall, and preferably several times as great. As a specific example, where the conduit wall thickness is one-eighth inch, the shortest path from the position of the weld to the inner wall of the conduit may advantageously be greater than three-quarters inch, and preferably about one inch or more.

The essential requirements of the structure are the provision of an internal mating structure on the two adjoining pipe sections cooperating to define a continuation of the conduit through the position of the joint, such as the male and female spigot and tapered neck portions of the respective pipe sections, and cooperating or mating sleeve-like flange members on the respective pipe sections which are of greater diameter than the portions defining the continuation of the conduit and adapted to extend concentrically around such continuation portions in spaced relation thereto, such two mating flange members being adapted for interattachment by means of a heat-generated attachment. Each of these flange members engages the corresponding pipe section, either by being formed integrally therewith or by being secured thereto or otherwise brought into engagement therewith, in such manner as to hold the pipe sections together and prevent longitudinal displacement thereof when the two flange members are secured together. Thus, such flange member may be formed as an integral part of the pipe section as illustrated by the integrally formed bell portion 3, 21, 31, 41, 61, 67a and 67b, or 81 in Fig. 1, 3, 4, 5, 6, 7 or 9, or as illustrated by the integrally formed flange portion 74a and 74b or 76a and 76b in Fig. 8, or 91 in Fig. 10; or it may comprise a member rigidly secured to the pipe section by welding or otherwise as illustrated at 7, 27, 37, 49, 64, 70, or 84 in Fig. 1, 3, 4, 5, 6, 7, or 9; or it may comprise a separate member engaging abutment means on the pipe section, as illustrated by the collar 95 described hereinafter in connection with Fig. 10.

It will be appreciated, as above brought out, that the desired fluid-tight seal between the adjacent pipe sections may be secured at the inner wall portion, as at the position of the male and female spigot and neck portions of the respective pipe sections, or at the position of attachment of the outwardly spaced cooperating flange portions. It will thus be seen that in constructions where the fluid seal is secured at the inner wall portion, the outwardly spaced cooperating flange members need not be rigidly secured to the pipe sections, as the function thereof would be merely that of preserving the joint against longitudinal displacement. For example, referring to Fig. 10, I have shown a joint construction comprising a bell-ended pipe section 90 provided with a flange member 91 and a tapered neck portion 92 defining a "bell," and a spigot section 93 provided with a spigot end 94 mating with the tapered neck portion 92. The mating outwardly spaced flange portions for the respective pipe sections 90 and 93 are provided by the member 91 and a collar member 95. The collar member 95 extends concentrically about the pipe section 93, and has an outer sleeve portion 96 mating concentrically with the flange 91. After the collar 95 is placed in position on the section 93, the pipe wall of said section may be deformed outwardly as at 97 so as to form in abutment or shoulder against which the collar 95 may bear when the two pipe sections 90 and 93 are intersecured by the weld or other heat generated attachment as at 98. The collar 95 may obviously be made in several pieces, i. e., "split" to facilitate assembly in the field, the parts being intersecured in the section-joining operation.

In assembling the sections, each successive section may be forced into the desired position of engagement with the next adjoining or previously laid section in any suitable manner as by delivering blows of a ram or mallet against the opposite end of the section being laid, through a suitable impact-transmitting block or the like, so as to provide a fluid-tight seal between the spigot portion of one section and the mating portion of the next section, and the subsequent securing together of the two sections by the described welding or other heat-generated attachment serves to hold the sections securely in this position of engagement. When the construction and method of assembly are such that a fluid-tight seal is provided between the spigot and neck portions of adjacent sections it will be obvious that, since the only necessary function of the field weld or other heat-generated attachment is that of holding the sections against relative longitudinal movement, this attachment need not be continuous and may be formed by simply tack welding or spot welding.

I claim:

1. In a conduit having a heat-destructible internal protective coating, a joint structure which comprises: two alined pipe sections having bell and spigot joint means whereby said sections may be joined together to form a conduit; a heat-destructible protective coating disposed at the inner peripheral surface of said pipe sections and extending throughout the length of said conduit; a flange member for each of said pipe sections, said flange members being provided with cooperating sleeve portions of greater diameter than the conduit so formed and extending concentrically around said conduit in outwardly spaced relation thereto, said sleeve portions being adapted to mate with one another at a position at which each sleeve portion is spaced outwardly from the conduit so formed and in such manner as to provide for application at said mating position of a heat-generated attachment of the type characterized by welding, brazing, or soldering, said protective coating being sufficiently removed from said mating position to prevent destruction of said coating by heat during application of said heat-generated attachment and said flange members engaging the respective pipe sections to maintain said pipe sections against longitudinal displacement upon application of such attachment at said mating position.

2. In a conduit having a heat-destructible internal protective coating, a joint structure as set forth in claim 1, in which the bell and spigot joint means comprises a neck portion on one of said pipe sections and a spigot end portion on the other of said pipe sections adapted to fit closely within said neck portion, and in which the flange member for said one pipe section is formed as an integral part of said one pipe section and the flange member for said other pipe section is rigidly secured to said other pipe section.

3. In a conduit having a heat-destructible internal protective coating, a joint structure as set forth in claim 1, in which the bell and spigot joint means comprises a tapered neck portion on one of said pipe sections and a tapered spigot end portion on the other of said pipe sections adapted to mate with said tapered neck portion, and in which the flange member for said one pipe section is formed as an integral part of said one pipe section and the flange member for said other pipe section is rigidly secured to said other pipe section.

DOUGLAS A. STROMSOE.